US008181387B2

(12) United States Patent
Loebl et al.

(10) Patent No.: US 8,181,387 B2
(45) Date of Patent: May 22, 2012

(54) PLANT GROWTH DEVICE

(75) Inventors: Hans-Peter Loebl, Monschau-Imgenbroich (DE); Joseph Hendrik Anna Maria Jacobs, Eygelshoven (NL); Wolfgang Otto Budde, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 140 days.

(21) Appl. No.: 12/445,471

(22) PCT Filed: Oct. 11, 2007

(86) PCT No.: PCT/IB2007/054145
§ 371 (c)(1),
(2), (4) Date: Apr. 14, 2009

(87) PCT Pub. No.: WO2008/047275
PCT Pub. Date: Apr. 24, 2008

(65) Prior Publication Data
US 2010/0031564 A1 Feb. 11, 2010

(30) Foreign Application Priority Data
Oct. 19, 2006 (EP) .................................... 06122555

(51) Int. Cl.
*A01G 9/00* (2006.01)
(52) U.S. Cl. ............................................... 47/39; 47/18
(58) Field of Classification Search ............... 47/18, 39; 248/27.8; 362/249.01, 101; 313/504; *A01G 9/00, A01G 1/00; A47G 7/00; F21S 4/00; F21V 33/00; H01J 1/62*
See application file for complete search history.

(56) References Cited

U.S. PATENT DOCUMENTS

| | | | | |
|---|---|---|---|---|
| 3,664,063 A * | 5/1972 | Ware | .................. | 47/39 |
| 3,772,827 A | 11/1973 | Ware | | |
| 4,045,911 A * | 9/1977 | Ware | .................. | 47/39 |
| 4,170,844 A | 10/1979 | Steele | | |
| 4,244,145 A * | 1/1981 | Polacsek | ........... | 47/17 |
| 4,513,531 A * | 4/1985 | Lestraden | .......... | 47/39 |
| 4,514,929 A * | 5/1985 | Lestraden | .......... | 47/17 |
| 5,739,545 A * | 4/1998 | Guha et al. | ....... | 257/40 |
| 6,231,205 B1 * | 5/2001 | Slesinger et al. | ............. | 362/133 |
| 6,474,838 B2 * | 11/2002 | Fang et al. | ..................... | 362/231 |
| 2001/0047618 A1 * | 12/2001 | Fang et al. | ..................... | 47/65.5 |
| 2002/0047646 A1 | 4/2002 | Lys et al. | | |
| 2004/0264160 A1 * | 12/2004 | Bienick | ........... | 362/31 |
| 2006/0032830 A1 * | 2/2006 | Engel | ............. | 211/187 |
| 2008/0043456 A1 * | 2/2008 | Bernardini et al. | ............ | 362/94 |

FOREIGN PATENT DOCUMENTS

| | | | |
|---|---|---|---|
| EP | 0937385 A1 | | 6/1998 |
| EP | 1543718 A1 | | 6/2005 |
| JP | 2003000059 A | | 1/2003 |
| JP | 2003052246 A | * | 2/2003 |
| JP | 2004321074 A | | 11/2004 |
| JP | 2005065559 A | * | 3/2005 |

* cited by examiner

*Primary Examiner* — Son T Nguyen
*Assistant Examiner* — Kathleen Iwasaki
(74) *Attorney, Agent, or Firm* — Mark L. Beloborodov

(57) ABSTRACT

Disclosed is a rack for growing plants, including mounting means and a plurality of shelve means spaced vertically. Each of the plurality of shelve means is configured to slide generally horizontally in and out of said mounting means and includes a carrier element; and at least substantially planar light emitting element disposed under the carrier element and formed by at least one OLED. Positions of each of the plurality of shelve means are interchangeable relative to the mounting means.

10 Claims, 3 Drawing Sheets

PLANT GROWTH DEVICE

This invention relates to a plant growth device and a rack for growing plants.

In horticultural plant production greenhouses are often equipped with artificial light sources to extend the day length to grow plants over an extended time period of the year. This allows the producer to bring plants to the market on demand. Since room in greenhouses is costly, it is desirable to grow some plants or seeds in compact racks, in which plants are grown in shelves where several shelves may be arranged on top of each other. Since such an arrangement shields most of the daylight from the plants in the lower shelves, artificial lighting is necessary. Today several types of plant lamps are used in greenhouses: incandescent light bulbs, Sodium high-pressure light bulbs, fluorescent gas discharge lamps, etc. All these light sources have the drawback that they are point sources and do not distribute light as homogenously as sunlight illuminates plants.

In the JP 2004/321074 A a method for growing plants using an electroluminescence light source is described. Light sources using an organic electroluminescence sheet have the advantage that larger area light emitting elements can be built to illuminate the plants. Unfortunately, electroluminescence light sources are known to be costly and extremely inefficient. So the use of the described method for growing plants is not appropriate for horticultural plant production in greenhouses.

Thus, the invention has for its object to eliminate the above mentioned disadvantages. In particular, it is an object to the invention to provide an efficient and large area illumination, which runs at a low cost.

Also the object is achieved by a rack for growing plants as taught by embodiments of the present invention. This object is also achieved by a plant growth device according to further embodiments of the present invention.

The object of the invention is achieved by a rack for growing plants with a mounting mean and at least two shelve means, wherein each shelve mean comprises a carrier element and a light emitting element, wherein the light emitting element is arranged below the carrier element and whereon the carrier element a plant can be arranged to grow, wherein the shelve means are arranged on top of each other within the mounting mean, wherein the light emitting element of the upper shelve mean emits light, being directed at least partially on the carrier element of the next subjacent shelve mean, and wherein the light emitting element consists of at least one OLED. In one embodiment, the OLED comprises at least a planar form, partially. In another embodiment the shelf means may differ from each other.

The invention discloses a rack which consists of a mounting mean and at least two shelve means. The mounting mean functions as a fixture for the two shelve means, whereas the shelve means store the plants or the seeds which shall be grown in the rack. As at least two of the shelve means are arranged on top of each other, the daylight for the plant in the lower shelve mean is shielded. In this case the artificial light of a light element is necessary. Therefore it is intended that the shelve mean comprises a carrier element and a light emitting element. In contrast to the above described plant growth device the light emitting element is positioned below the carrier element. By arranging several shelve means on top of each other the light emitting element of the upper shelve mean lightens the carrier element of the lower shelve mean. Through the usage of large area OLEDs the plants in the shelve means can be illuminated homogeneously and moreover, OLEDs can be tuned to the absorption spectrum of the plants.

Organic light emitting diodes can be built by depositing different layers of material on a substrate. So theoretically it is possible to build large OLEDs, so that with respect to the invention the underside of the carrier element could be covered by one large OLED. Nevertheless, the production of OLEDs with a small size, for example 30×30 cm is cheaper and an exchange in case of a failure of one OLED can easier be achieved. In addition individual OLED elements can be turned off and on if an array of OLED is used. Thus, the amount of light generated by the light emitting element can be tuned to the requirements of the plants or the seeds. If the granularity of the array is not too high, the light emitting element combines the advantages of a homogeneous light distribution with the possible individual adjustment of the light output.

According to another embodiment of the invention the array of the OLEDs consists of at least two different groups of OLEDs, wherein the first group of the OLEDs delivers a grow light and the second group of the OLEDs delivers a control light for the plant. It is known, that the sheer growth of the plant is mainly depending on the amount of light, possessing the wavelength absorbed by Chlorophyll A or B. To achieve a generous growth of the plant the fist group of OLEDs of the light emitting element should consists of at least two types of OLEDs, emitting at different wavelength. It is preferred that the first type of OLED emits in the region of blue light with a wavelength between 400 nm to 500 nm. Furthermore the second type of OLED should emit in the region of red light between 600 to 700 nm. In another preferred embodiment the grow light emitted by the first group of OLEDs can consists of approximately 80% to 90% red light and 10% to 20% blue light.

In addition to the described grow light a control light should be used to steer the growth of the plants. The growths of a plant whether it is huge or small and compact can be controlled by illuminating the plant with light of different colors. It is known, that the use of a large amount of blue light (400 nm to 500 nm) results in a huge plant whereas the use of a small amount of blue light results in a small and compact plant. Furthermore the light in the green spectrum increases the tendency of the plant to breed. By controlling the type of wavelength being emitted onto the plants, the way and the manner of the growing of the plant can be controlled. This embodiment also shows the advantage of OLEDs compared to normal plant lamps in use today. Those plant lamps have a broad emission spectrum and therefore emit light in all kind of wavelength. In comparison OLEDs have very small emission bands so that the amount and the wavelength of the light being emitted onto the plants can precisely be controlled. OLEDs can be used for plant control, e.g. blooming, growing, propagation etc.

According to a preferred embodiment of the present invention, the mounting mean and/or the shelve mean contain at least parts of an electronic power supply, at least one power line and the driver for the OLED. By integrating parts of the power supply for the OLEDs in the shelve mean an individual supply of current and voltage to each light emitting element is possible. This separate driving of the light emitting elements in a rack has the advantage, that if different sorts of plants or seeds are grown, the illumination of each shelve mean can individually be controlled. Not only the time and length of the illumination can vary but also the wavelength of the emitting OLEDs. So depending on the type of plant or seed OLED with different emission spectrums and therefore different demands to their power supply can be used. In contrast to this modular design the use of just one electrical power supply which is embedded in the mounting mean has the advantage of being highly cost efficient. Furthermore it is secured that the whole rack is supplied with the same amount of current or voltage.

The driver, that might be integrated in the mounting mean or the shelve mean is used for controlling the light quality, light quantity and light circle of the lamps. The driver may include a current amplifying circuit and a waveform generating and controlling circuit, which outputs the desired waveform (for example: square waves, triangular waves, sine waves or pulses). Also, the waveforms amplitude, frequency and duty ratio are adjustable by the waveform generating and controlling circuit.

In another preferred embodiment of the rack for growing plants the mounting mean and the shelve mean contain either a plug element or a socket element, wherein the mounting mean and the shelve mean can be put together and as a result the plug element and the socket element form a connection for the electric power supply. This embodiment allows a modular design for the rack, wherein each shelve mean can individually be connected with the mounting mean. The two connecting elements plug and socket can not only be used as a part of the electrical power supply. They also can be part of a computer control system which drives and/or controls each shelve mean, especially each light emitting element. For example the plug element and socket element can be parts of known interfaces like USB, serial or parallel. In combination with sensors for the temperature, the emitted light, or the humidity of the soil a greenhouse can be controlled by a single computer which is connected to each rack. As a part of this complete control system the carrier element can comprise a water supply for the plant. This water supply can be connected to a larger water supply system mounted into the rack. By using computer controlled valves an adjusted irrigation is possible. So the amount of water supplied to each shelve mean in one rack can vary depending on the type of plants arranged on each shelve mean.

According to another embodiment of the invention the carrier element comprises a soil or substrate on which the plant can grow. It is known to embed the plant in an individual pot or in a larger flower bed. Both opportunities can be realized in the carrier element of the present invention. Additionally, the carrier element can be filled with a substrate like a nutrient fluid. Those fluids have the advantage that less dust and dirt are generated and the environment in the greenhouse is clearer and therefore a more homogeneous growing without the possible influence of weeds can be achieved.

In another preferred embodiment of the present invention the shelve means serves as a heat sink, conducting the heat away from the OLED. Although the current consumption of an OLED is very low, it nevertheless produces heat. To withdraw the heat from the OLED the shelve mean can function as a bridge to the heat sink of the mounting mean. Both of which are constructed of material, which has to be heated up and has a large surface. So on the one hand the heating of the material of the mounting mean and the shelve mean and on the other hand the radiation of heat from those two means into the surrounding allows the OLED to stay within an appropriate temperature level. Additionally, in another preferred embodiment the shelve mean evenly distributes the heat of the OLED to the above arranged carrier element. The heat emitted by the OLED is used to heat this shelve mean and especially the carrier element which comprises the soil or the substrate wherein the plants are growing. This embodiment is especially useful for greenhouses which are also used in the cold seasons. Normally plants grow better if a high ambient temperature is provided. To reduce the costs for heating the greenhouse, the heat, emitted by the OLED can be used to provide the necessary temperature for the plants to grow efficient.

Due to the possibility to built OLEDs on more or less all kind of substrates the degree of freedom for the design of the light emitting element is large. So apart from a planar, sheet like design the light emitting element can also have a curved surface, U-shaped or box-shaped design. In one preferred embodiment the light emitting element extends to the subjacent shelve mean and thereby covering at least parts of the side of the plant. This embodiment is appropriate in those kinds of cases, where the plant needs a close light emitting element, which more or less surrounds the plant. Thereby an extremely intense flow of light can be achieved.

In horticulture plant production greenhouses large number of different plants and seeds are grown parallel. Therefore a modular rack system is desirable, which allows the exchange of plants which already have achieved their final size. This modular structure is part of another preferred embodiment of the present invention, in which the rack comprises a first rail system, wherein at least one first rail is arranged at the mounting mean and the first rail carries at least one wheel, being attached to the shelve mean. The term first rail system encloses all kind of mechanical systems which enable the shelve mean to be linearly inserted into the mounting mean like linear motion bearings or slides. The aim that has to be achieved by the first rail system is the possibility of an exchange of the shelve mean without the need for dismantling the mounting mean. This aim is for example achieved by mounting two slides within the mounting mean opposite to each other. On or within this slides balls or wheels can run and are guided in their linear motion. By attaching these wheels or balls to the shelve mean one can guarantee, that the shelve mean can easily be inserted into the mounting mean and also be quickly exchanged. The described embodiment enables the exchange of the shelve mean if the plants are fully grown.

The idea of a modular structure is also part of another preferred embodiment of the present invention. According to this embodiment the shelve mean comprises a second rail system, wherein at last one second rail is arranged in the shelve mean and the second rail carries at least one coil type mean, being attached to the light emitting element. As mentioned above the term second rail system is not limited to rails as such. Rather encloses all kinds of systems which enable the light emitting element to be driven into or out of the shelve mean. Normally OLEDs have extremely long duty cycles. Nevertheless in the event of a failure of one OLED it has to be exchanged. Therefore the described modular system has the advantage, that the light emitting element which comprises the OLED or the array of the OLEDs can easily be extracted from the shelve mean, even if the shelve mean is still mounted within the mounting mean. Apart from the described advantage it is also possible to install different type of OLEDs in the light emitting element which have different peak wavelength. Therefore the light emitting element can consists out of a frame, which houses individual OLED segments, wherein each of these OLED segments can for example measure 30×30 cm and is individually connected with the frame. Therefore it is appropriate that each section of the frame has its own socket/plug connection.

In another embodiment the OLED comprises a substrate and a cover layer, both of them being at least partially transparent to either side. As described above OLEDs are made by depositing different layers on a substrate. Often these layers are covered by a cover layer, which is protecting the OLED from outside influences. Depending on the transparency of either the substrate or the cover layer the OLED is a bottom or a top emitting device. In the preferred embodiment the OLED emits light in both directions. This has the advantage, that the light emitting element, being planar embedded in the shelve mean can emit light into the direction of the subjacent shelve mean and also in the direction of the upper carrier element. This might be advantageous, if a nutrient fluid is used to grow the plants.

The aforementioned usage of an OLED in a plant growth device and a rack, as well as claimed components and the components to be used in accordance with the invention in the described embodiments, are not subject to any special exceptions with respect to size, shape, material selection as technical concept such that the selection criteria are known in the pertinent field can be applied without limitations. Additional details, characteristics and advantages of the object of the present invention are disclosed in the subclaims and the following description of the respective figures—which are an exemplary fashion only—shows a preferred embodiment of the illumination device according to the present invention.

The object of the invention is also achieved by a plant growth device with a carrier element and a light emitting element, whereon the carrier element a plant can be arranged to grow, with a driver being connected with a source and the light emitting element, wherein the light emitting element is arranged in a distance to the carrier element to illuminate the plant, wherein the light emitting element consists of at least one OLED. The OLED comprises preferably at least a planar form, partially. The light emitting element may also comprise other light sources such as LEDs, fluorescent lamps, incandescent lamps etc. additionally to the OLED. The source to provide operation power to operate the light emitting element can be any suitable power source. In one embodiment, the light emitting element covers the carrier element at least partially. In another embodiment, the OLED comprises at least a planar form, partially.

An organic light emitting diode (OLED) is a special type of light emitting diode (LED) in which the emissive layer comprises a thin film of certain organic components. The advantage of the OLED is its high efficiency and hence, OLEDs are better suited for horticulture applications where the total cost of ownership is important. These OLEDs utilize current passing through a thin-film of organic material to generate light. The colour of light being emitted and the efficiency of the energy conversion from current to light are determined by the composition of the organic thin-film material. However, the OLEDs comprise a substrate material as a carrier layer, which may be made of glass or an organic material or from non transmittive materials such as metal foils. Furthermore organic light emitting diodes consist of at least one very thin layer with a layer thickness of approx. 5-200 nm of organic substances on a glass substrate covered with an electrically conducting and optically transparent oxide. This conducting layer usually is performed as an Indium-Tin-Oxide (ITO).

Usually the ITO-layer forms the anode and a layer of Aluminium forms the cathode, whereas the Aluminium layer features a thickness of approx. 100 nm and thus a thickness like the ITO-layer. Aluminium of such a thickness works as a mirror, such that the emission is through the transparent ITO anode and the transparent substrate only. If the cathode metal is thin enough to be partially transparent, part of the light can also be emitted through the cathode.

The disclosed plant growth device can be used for different applications and not only for greenhouse lighting. So the plant growth device can for example be used to irradiate single plants in buildings or houses. Modern multi-storey buildings often comprise large entrance halls, which are purely lighted by the sunlight. To enable a friendlier environment in these entrance halls the disclosed plant growth device can be used to irradiate the plants with artificial light of the OLED. Thus, a natural and noble growth of the plant can be achieved. A further advantage of the described growth plant device is that the light emitting element possesses a large degree of freedom of the design. So on one hand the light emitting element, respectively the OLED, can be arranged parallel to the plane of the carrier element. Thereby a very homogeneous illumination of the carrier element and of the plants can be achieved. On the other hand the light emitting element can be formed in different shapes. Thus, the light emitting element can be mounted as a screen, which is shielding parts of the plant. In this embodiment the OLED can be arranged in the back of the plant, so that not only the plant but also the surrounding is illuminated by the OLED.

Theses figures are:

Figure 1:
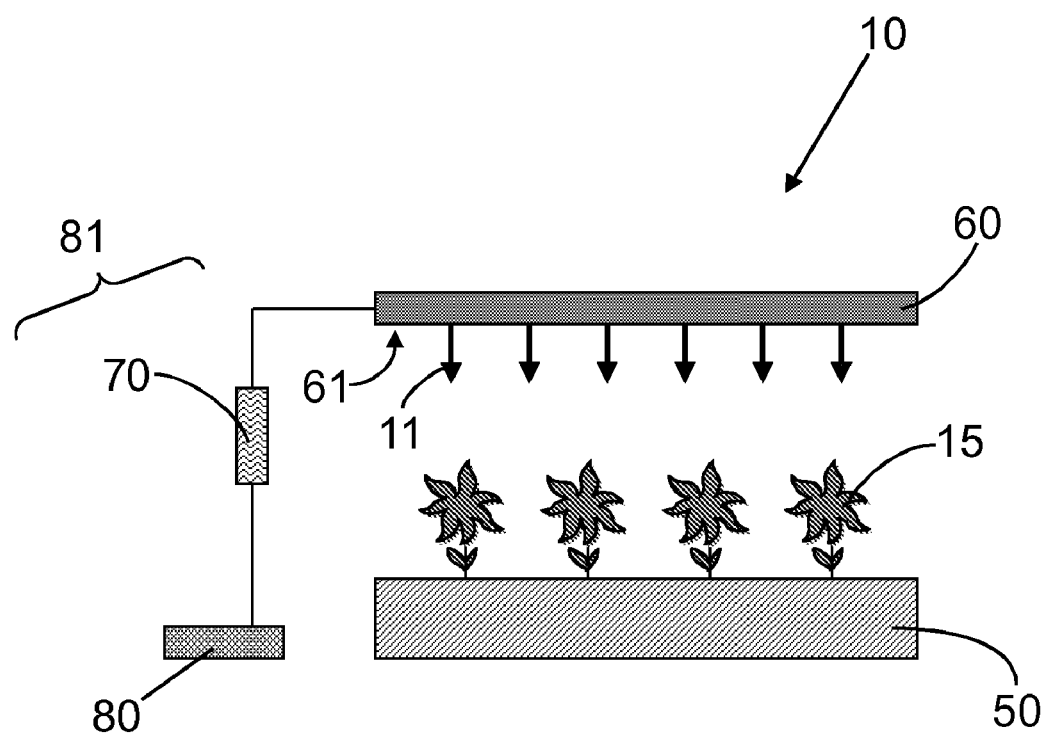
FIG. 1 shows a schematic view of a plant growth device.

FIG. 1 shows a schematic view of a plant growth device 10 with a carrier element 50 and a light emitting element 60. In the carrier element 50 a soil or a substrate can be embedded, in which plants 15 or seeds can be cultivated to grow. Within a distance above the carrier element 50 the light emitting element 60 is arranged. The light source within the light emitting element 60 is at least one OLED 61, which has at least partially a planar form. Additionally, the light emitting element 60 covers the carrier element 50 at least partially and illuminates the plants 15 with the emitted light 11.

According to FIG. 1 the light emitting element 60 is connected to a driver 70 and a source 80. Both elements 70, 80 are part of the electrical power supply 81 to drive the light emitting element 60. The light emitting element 60 can comprise one or several OLEDs arranged within an array. As OLEDs are large area light sources, which have a size of for example 30×30 cm or larger, one can easily cover even large light emitting elements 60 with a few OLEDs 61. The light emitting element 60 can comprise a frame structure, so that each OLED 61 is individually mounted. In a further embodiment the frame structure comprises for each OLED 61 an electrical connector for joining the electrical circuit. So each and every OLED 61 can individually be provided with a needed voltage and/or current. Thereby the form and the amount of the light 11 emitted by the light emitting element 60 can be adjusted to the needs of the plants 15.

Figure 2:
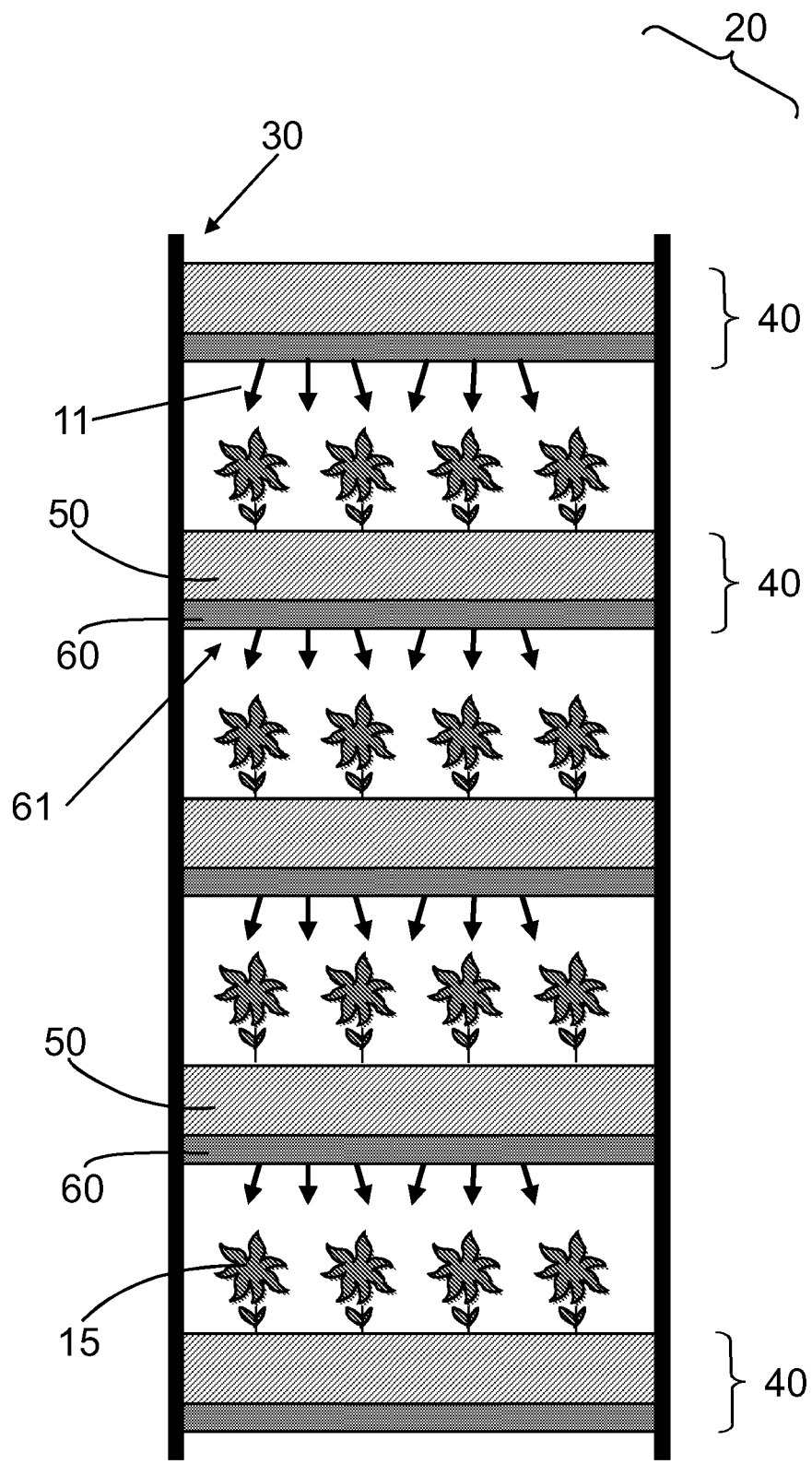
FIG. 2 shows a rack for growing plants comprising a mounting mean and several shelve means.

FIG. 2 shows a rack 20 for growing plants 15 with a mounting mean 30 and a plurality of shelve means 40. Each shelve mean 40 comprises a carrier element 50 and a light emitting element 60. In contrast to the above described plant growth device 10 the light emitting element 60 is arranged below the carrier element 50. By positioning the plurality of shelve means 40 on top of each other a rack 20 is achieved, that offers a large amount of space to grow plants 15 but requiring just a limited room in a greenhouse. Since in such an arrangement the shelve means 40 will shield most of the daylight form the plants in the lower shelve means 40, artificial lightning is necessary. According to FIG. 2 the light emitting element 60 of an upper shelve mean 40 emits light 11, that is being directed at least partially on the carrier element 50 of the next subjacent shelve mean 40. As described above one feature of the invention to overcome the disadvantages of known racks is the use of at least one OLED 61. Illumination devices basing on organic light emitting diodes are in general very thin, so that even a multi-layer OLED 61 only possesses a thicknesses which is in the order of a few millimeter. With respect to the height of the carrier element 50 the height of the light emitting element 60 is neglectable or—if the height of the light emitting element is dominated by the electrical power supply—still small. Because of this, the number of shelve means 40 which can be mounted into the shown rack 20 is the same as by conventional racks, which do not have artificial light sources.

Figure 3:
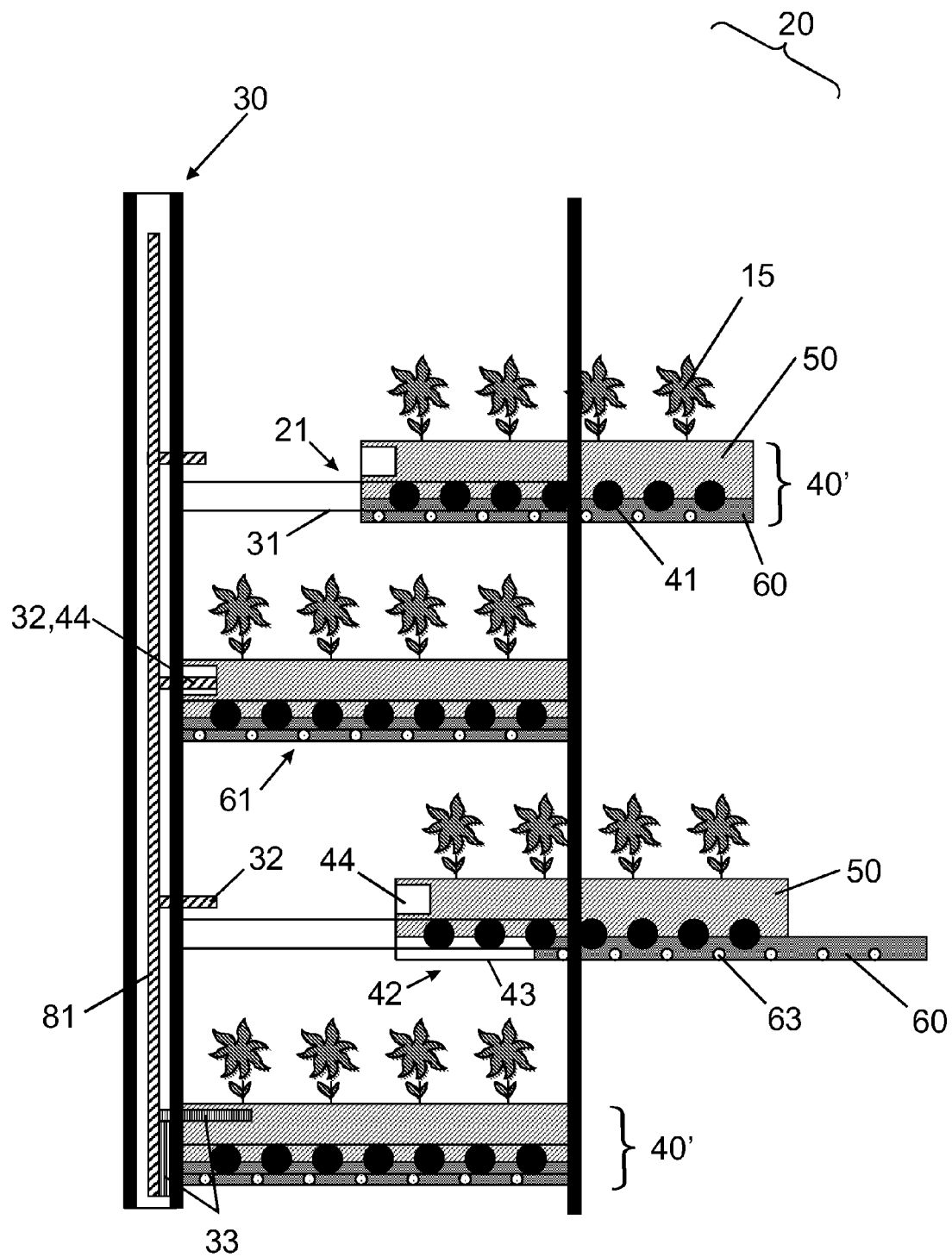
FIG. 3 shows a schematic view of the rack for growing plants according to a second embodiment of the present invention.

In FIG. 3 another preferred embodiment of the rack 20 is shown, comprising a plurality of shelve means 40', which are arranged on top of each other within the mounting mean 30. Each shelve mean 40' comprises a socket element 44 which can be connected to a plug element 32, arranged at the mounting mean 30. The plug element 32 and the socket element 44 join an electrical power supply 81 together with the light emitting element 60. The achievable electrical connection can easily be established and separated in the case of an exchange of the shelve mean 40'. To ease this exchange the rack 20 contains a first rail system 21, comprising of a first rail 31 arranged at a mounting mean 30 and at least one wheel 41, being attached to the shelve mean 40'. In the shown embodiment the first rail consists of two rail guides which guide the plurality of wheels 41, being mounted to the two opposite longs sides of the shelve mean 40'. On the one hand the first rail system 21 fixes the vertical position of the shelve mean 40' with respect to the mounting mean 30. On the other hand the first rail system 21 enables the shelve means 40' to be pulled out or put into the mounting mean 30 in a horizontal manner.

To further extend the idea of a modular rack 20 the shelve mean 40' comprises a second rail system 42. In the shown embodiment the light emitting element 60 is constructed like a drawer which can be pulled out of the shelve mean 40'. Therefore the shelve mean comprises a second rail 43, being positioned in the bottom of the shelve mean 40'. The second rail 43 functions as a guide for the coil type mean 63, being attached to the light emitting element 60. Through the use of the second rail system 42 an easy exchange of the light emitting element 60 is possible.

To irrigate the plants 15 a water supply 33 can be installed in the rack 20. As shown in FIG. 3 parts of the water supply 33 are arranged within the mounting mean 30. Through a connection with a plug element 32 and a socket element 44 the water supply 33 of the mounting mean 30 can be connected to the water supply 33 arranged in the shelve mean 40'. By the use of computer controlled valves an individual irrigation of all plants 15 in each shelve mean 40' can be achieved.

The invention claimed is:

1. A rack for growing plants, comprising:
   a mounting rack to receive a plurality of shelves;
   said plurality of shelves spaced vertically in said mounting rack; each of said plurality of shelves slidably received horizontally in and out of said mounting rack and having a carrier element; and
   a substantially planar light emitting element disposed under said carrier element and formed of an array of OLEDs;
   a plurality of electrical connectors associated with each of said plurality of shelves; each of said plurality of connectors comprises a first part attached to said mounting rack and a second part attached to one of said plurality of shelves, and
   at least one supply line coupled to said each of said plurality of connectors;
   wherein positions of each of said plurality of shelves are interchangeably slidably receivable within said mounting rack, and each of said plurality of connectors are configured to electrically engage one of said first parts with one of said second parts in proximity of an inner limit of a slide of a corresponding one of said plurality of shelves;
   each of said shelves further having a first rail system and a second rail system below and independently slidable from said first rail system.

2. The rack of claim 1, wherein said array of OLEDs is attached to said carrier element and covers substantially an entire bottom surface thereof.

3. The rack of claim 1, wherein said array of OLEDs comprises a first group of OLEDs emitting a grow light and a second group of OLEDs emitting a control light.

4. The rack of claim 1, further comprising one or more components of an electrical power supply and a driver for the array of OLEDs.

5. The rack of claim 1, wherein the carrier element comprises a water supply.

6. The rack of claim 1, wherein the carrier element comprises a soil or substrate facilitating growth of the plants.

7. The rack of claim 1, wherein each of said plurality of shelves is configured for dissipating heat generated by the array of OLEDs.

8. The rack of claim 1, wherein said mounting rack and said first rail system comprise a plurality of generally horizontal first rails spaced corresponding to said spacing of said plurality of shelves and said each of said plurality of shelves comprises at least one wheel set configured to ride on one of said plurality of generally horizontal first rails.

9. The rack of claim 8 wherein said second rail system carries said planar light emitting element.

10. A rack for growing plants and having slidable shelves, comprising:
    a mounting rack having at least one first rail system having at least one first rail mounted to said mounting rack;
    a plurality of shelves, each of said shelves having a carrier element for receiving plant material, each of said shelves received within said mounting rack by said at least one first rail system;
    a substantially planar array of OLEDs disposed under each of said carrier elements of each of said shelves;
    a plurality of removably affixable electrical connectors allowing electrical connectivity between said array of OLEDs and an electrical power supply through said mounting rack;
    wherein each of said shelves are mounted horizontally within said mounting rack and are slidable on said first rail system for interchangeable positioning on said mounting rack;
    wherein said array of said OLEDs on each shelf dissipates heat into said carrier element receiving said plant and directs light downward onto a next adjacent lower shelf slidably received in said mounting rack; and a second rail system below said first rail system on which said array of OLEDs is mounted for each of said shelves, said array of OLEDs slidable below and separately from said carrier element.

\* \* \* \* \*